United States Patent [19]

de Cortanze

[11] Patent Number: 4,834,408
[45] Date of Patent: May 30, 1989

[54] WHEEL SUSPENSIONS OF LAND VEHICLES AND ESPECIALLY OF STEERABLE WHEELS

[75] Inventor: André de Cortanze, St. Cloud, France

[73] Assignee: Elf France, Courbevoie, France

[21] Appl. No.: 142,497

[22] Filed: Jan. 11, 1988

[30] Foreign Application Priority Data

Jan. 12, 1987 [FR] France ............................... 87 00208

[51] Int. Cl.$^4$ ............................................. B60G 3/20
[52] U.S. Cl. ................................... 280/96.1; 180/219; 280/660; 280/675
[58] Field of Search ................... 280/92, 93, 96.1, 660, 280/673, 675, 688; 180/219

[56] References Cited

U.S. PATENT DOCUMENTS 4,265,329  5/1981  de Cortanze ........................ 180/219
4,388,978  6/1983  Fior ..................................... 180/219
4,741,545  5/1988  Honma et al. ........................ 280/92

FOREIGN PATENT DOCUMENTS 7805284  2/1978  France .

Primary Examiner—Kenneth R. Rice
Attorney, Agent, or Firm—Burgess, Ryan & Wayne

[57] ABSTRACT

The present invention concerns an anti-dive suspension device for the front wheel of a vehicle presenting between the axle bracket and the vehicle body a kinematic suspension mechanism, wherein the relative movement of the stub axle bracket with respect to the vehicle body on horizontal ground, during functioning of the suspension, the geometry of the kinematic train ensures the horizontal moving apart of the stub axle with respect to the vehicle body when the load is increased and it relates to improvements to the wheel suspensions of land vehicles and especially of steerable wheels.

6 Claims, 4 Drawing Sheets

WHEEL SUSPENSIONS OF LAND VEHICLES AND ESPECIALLY OF STEERABLE WHEELS

BACKGROUND OF THE INVENTION

FIELD OF THE INVENTION

The present invention concerns improvements to wheel suspensions and in particular to steerable wheels of land vehicles and especially to those ensured by two lateral arms situated on the same side of the wheel.

Such devices are known in the prior art and in particular in French patent published under n° 2,418,141 (Andre de Cortanze).

According to this patent, the front suspension has the general form of a quadrilateral of which the apices are the ends of two arms, pivoted at one of their ends to an element integral with the vehicle body and at the other end to a carrier triangle for the stub axle of the front wheel.

The axis corresponding to the side of the said triangle joining the ends of the arms allows, turning the front wheel. It is realized by two pivoting and hinging devices with the ends of the arms of the swivel type or equivalent. The two arms are rotatively mounted on the vehicle body through two substantially horizontal axes (in normal position of the vehicle) and they are situated substantially in a single vertical plane thus containing the center of the swivel joints and the steering axis.

The shock absorbing and suspension system per se is essentially constituted by a spring/shock absorber assembly generally disposed between an arm and an element integral with the vehicle body. When the suspension functions, the arms pivot in the said vertical plane, provoking the displacement in this same plane of the swivel joints and thus of the steering axis.

With respect to the steering system itself, it is constituted by a side lever integral with the triangle moved by a kinematic train transmitting to the said lever the movements of the handle bar or other steering control device.

According to a novel solution which is the object of a patent application filed the same day as the present application by the applicant and having for its title "Improvements to steerable wheels of land vehicles" the two arms carry at their end a tetrahedric piece one apex of which is integral with the stub axle of the wheel, and three apices correspond to the centers of universal joints such as swivel joints, cardans or equivalent of two of them are pivoted to the suspension arms an define the steering axis, the third being pivoted to the kinematic train for steering control and thus for turning the wheels.

In the following description, reference will be made to this latter solution in order to illustrate the present invention, it being well understood that it applies to all suspensions with two arms.

It will furthermore be recalled that in most former systems, it has been sought to improve the stability and especially to avoid the phenomenon which is called "dive" and sometimes "leap".

Upon cycles and in particular motorcycles, but also on a number of other vehicles and in particular automobiles, a braking on the front wheel provokes a shifting torque towards the front so that the front suspensions are compressed while the rear suspensions are generally unloaded. This is increasingly clear since most frequently it is rendered apparent in a lowering of the front of the vehicle and the subsequent increase of the torque effects. Thus, on most motorcycles with conventional suspension having a fork and shock absorber and springs working along the length of the fork, the compression of the suspension is rendered evident by a shortening of the fork while the rear is in raised position.

On this type of vehicle with conventional suspension, the relative movements of the front and rear wheels are relatively easy to define, the axles describing straight lines or sometimes arcs of circles so that the dive or the anti-dive result from simple geometric arrangements and from definitions, there also relatively simple, of the static and dynamic rules applicable to the suspensions.

In the case of systems with two lateral arms or more than two arms, the geometric arrangements require more complex rules, so that the general reactions of a vehicle, for example in the case of braking, are relatively more difficult to foresee.

In fact, if reference is made to FIG. 1 representing very schematically a conventional bicycle front suspension without specific suspension, the axle is essentially subjected to two forces during braking, a reaction force P to the gravity (the weight of the loaded vehicle is statically distributed between the axles) and a reaction force F to braking (corresponding to deceleration). Upon halt or at constant speed in a straight line, F is nil and only P intervenes. In this description, the cases of cornering introducing, of course, complementary forces and especially the centrifugal force and the corresponding reaction will not be considered.

If the resulting $R_1$ (for the braking $F_1$) passes under the center of gravity G of the loaded vehicle, the corresponding torque tends to shift G towards the front and the motorcycle "dives" or "leaps". If this component $R_2$ (for the braking $F_2$) passes above G (which is the case of slight or nil braking) it goes in the opposite direction. FIG. 1 represents a component $R_2$ coinciding with the reaction in the fork.

When the situation according to FIG. 2 occurs with a front fork suspension, the case of most motorcyclettes, the resulting R will be divided into a force S provoking the deformation of the suspension and a component C which passing under the center of gravity G corresponds to a shift torque towards the front. In these cases, it is not possible to oppose to the dive provoked by the braking.

When the vehicle has a suspension that is geometrically more complex and in particular suspension with two arms or more, the determination of the dive or antidive conditions itself becomes very complex, so that it is difficult to define the geometries that are opposed or not to the dive. The applicant has been able to define simple conditions which, when they are satisfied by geometric definitions of the suspensions, ensure the antidive.

In the following description, are considered the positions and the movements taken relatively with respect to the body vehicle supposed to be fixed and suspended, in a position corresponding to that which it would have in lying on the ground with a mean load.

Considering in the longitudinal axial plane of the vehicle, the curve described by the axis of the wheel when the suspension functions, the applicant has observed that when the horizontal distance from the axis to an given point of the vehicle body remains constant or increases when the at least apparent load on the said axle increases, the suspension is inhibiting the dive of the vehicle whatever the type of suspension; this has a very interesting application in the case of the system with two bars or more for which the described curves are complex.

It will be recalled in particular that in a mechanical system where a plane $P_1$, (for example, that of the axle and of its bracket) is displaced with respect to a plane $P_0$ (that of the vehicle body) through a kinematic device (the two arms in the present example), the instantaneous center of rotation of $P_1$ with respect to $P_0$ describes in the plane $P_0$ a curve $b_0$ called base, and in the plane $P_1$ a curve $r_1$ called rolling which, during the movement of $P_1$ on $P_0$, rolls without sliding on the base $b_0$, each fixed point of $P_1$ (and in particular here at the axle 0) describing a curve of $P_0$ called roller $r_0$. What is important therefore is the roller $r_0$ described by the axle 0 in the plane $P_0$ of the vehicle body.

If the rule set out herein-above is applied, the at least apparent load increase is rendered evident by a displacement of 0 towards the top along the roller $r_0$ in the plane $P_0$.

If 0 is displaced towards the rear (in the case of the front wheel), i.e. towards the right of the figures, the suspension authorizes the dive. If 0 goes towards the front or remains at the same abcissae (with respect to the horizontal) there is no dive and the greater the displacement towards the front (on the left of the figures) the more the suspension presents an anti-dive behavior.

The tangents to the roller described by the axis of the wheel must therefore be at least vertical and preferably inclined downwards to the rear, towards the top in the front so that when the axis 0 climbs with respect to the vehicle body, it moves away towards the front.

In this description of the examples, reference will be made to steerable wheels suspension that raises the problem of steering. But, it is obvious that the appropriate suspension for a wheel that turns is a fortiori suitable for a non steerable wheel.

BRIEF DESCRIPTION OF THE DRAWING

In order to render more apparent the technical features, objects and advantages of the present invention, embodiments will now be described with reference to the appended drawings, these embodiments in no way being limitative as to the manner in which they are carried out and applications made thereof. In addition to FIGS. 1 and 2 described herein above, reference will be made to the following figures which schematically represent alternative devices according to the invention.

DESCRIPTION OF THE PREFERRED EMBODIMENT

Figure 3:
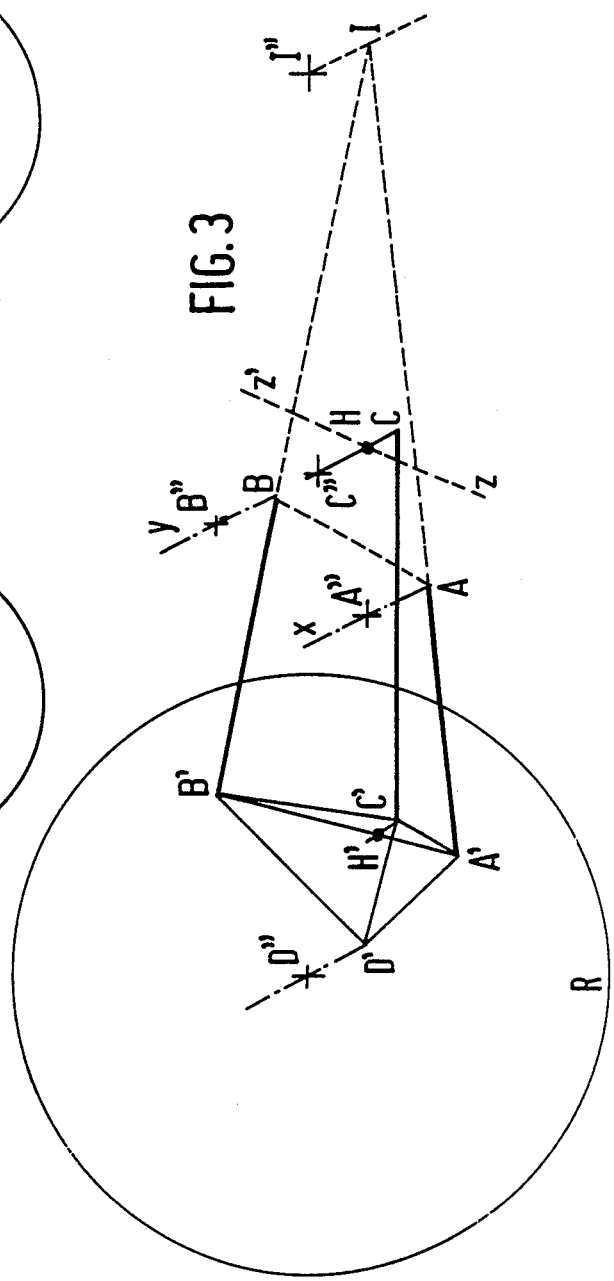
FIGS. 3 and 4 represent alternatives in the geometrical form.

FIG. 3 schematically represents the geometry of an embodiment according to the invention. Two axes Ax and By are substantially horizontal and orthogonal to the longitudinal axial vertical plane of the vehicle in "A" and "B". This plane is generally the plane of symmetry of the vehicle body, of its saddle, of the rear wheel and, for a zero steering angle, of the front wheel and of the handlebar or equivalent. This plane is vertical in normal rectilinear driving of the vehicle and inclines generally on cornering. It will be presumed hereinafter vertical in order to simplify the description. These axes correspond to axes integral with the motorcycle body as will be seen herein-below. Around these axes can pivot the straight lines segments AA' BB' corresponding to arms, these two segments AA' BB' being placed and preferably turning in a single vertical plane parallel to the longitudinal axial plane. The ends A' and B' of these segments AA' and BB' define an axis moving in a vertical plane when AA' and BB' pivot; this plane is the same as that one of the segments AA', BB'; the axis A'B' is the steering axis, it is associated to the axis D'D" of the wheel, D'D" and A'B' being segments of orthogonal but not converging straight lines, D'D" is therefore substantially horizontal and perpendicular to the vertical planes and especially to the axial longitudinal plane in D" center of the wheel R. A", B" and D" are thus coplanar in this axial longitudinal plane.

FIG. 3 corresponds to the axial position of the wheel R, i.e. to a zero steering angle. The point D' is the crossing point of the wheel axis D'D" with the plane passing through A'B' perpendicular to D'D". This plane is the vertical plane of AA'BB' when the steering angle is nil. It can pivot around the steering axis A'B', driving in its rotation the stub axle bracket A'B'C' and the axis D'D". A point C' outside this plane defines with the triangle A'B'D' a stub axle bracket tetrahedron A'B'C'D' adapted to pivot around the steering axis A'B'.

The axis A'B' can, as will be seen herein-below, be realized in the form of two universal joints such as swivel (blass and socket) joints, cardans or equivalent centered on A' and B'. When AA' and BB' pivot around the axes AA" and BB" of the vehicle body, A'B' moves in its vertical plane and drives C', D' and D" in a movement in the respective vertical planes parallelly to this axial longitudinal plane (or coinciding with this latter with respect to D").

One point C is adapted to turn around an axis zz' and in particular around its orthogonal projection H on zz'. This axis is preferably located in a vertical plane parallel to the axial longitudinal plane. The point C defines with the apex C' of the tetrahedron A'B'C'D' a straight line segment CC' that as will be seen herein-below can be characterized by a link or an arm CC' pivoted by universal joints or equivalent such as cited for A' and B', on the one hand to the tetrahedron A'B'C'D', and on the other hand to the segment CH itself realized by a crank turning around zz'. The rotation of HC around zz' provokes the movement of C', and D' and D" around A'B'.

As described in the prior art, the simultaneous pivoting of AA' and BB' around their respective axes AA" and BB" provokes the movement of A'B'C'D' and the instantaneous center of rotation of A'B'C'D', when the various elements are in the position of FIG. 3, is the point I of intersection of the straight lines bearing the segments AA' and BB'. On FIG. 3, this point I is on the side opposite the wheel R with respect to AB.

Figure 4:
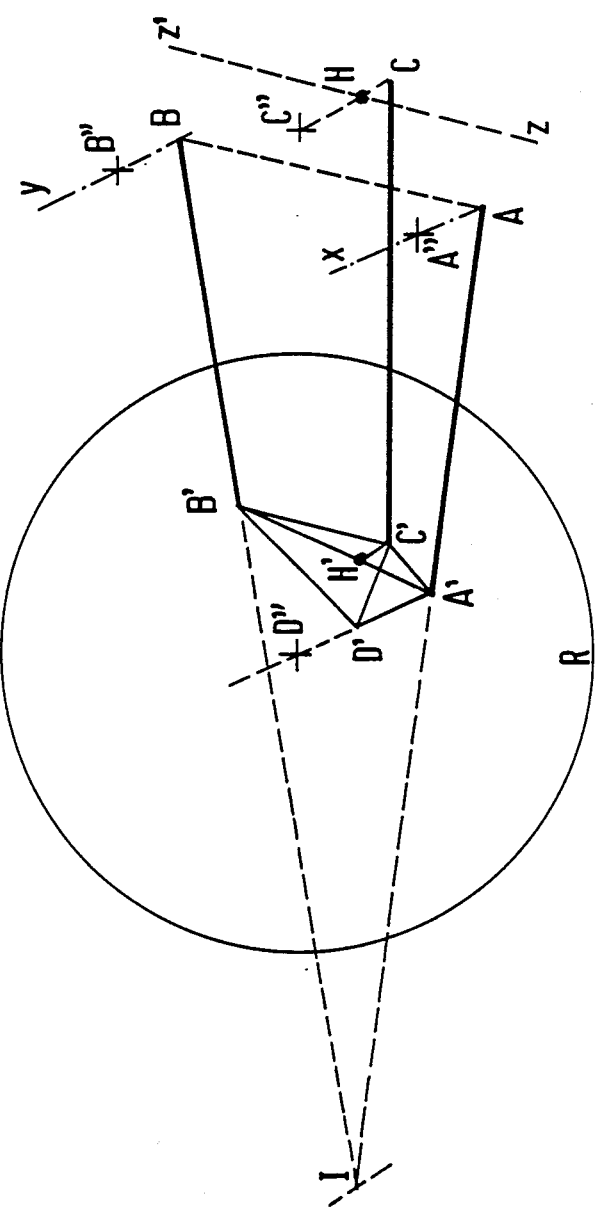

FIG. 4 is identical to FIG. 3 except that the point I is on the same side as the wheel R with respect to AB.

Figure 1:
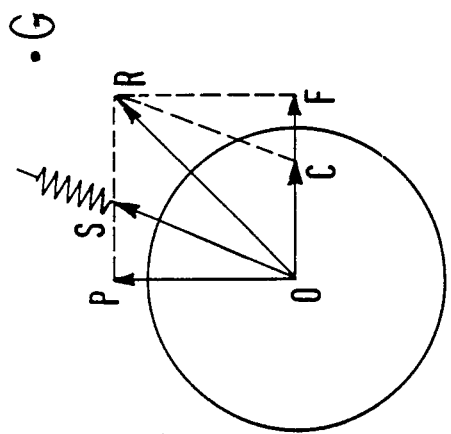
Figure 2:
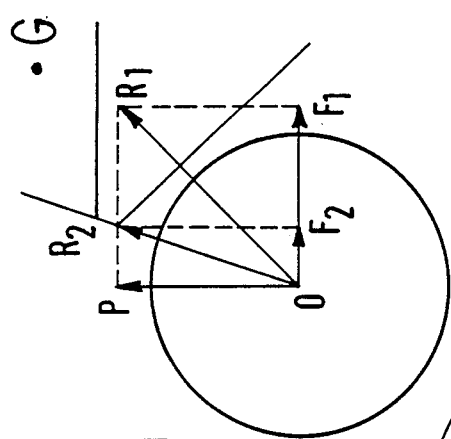

The arrangements of FIGS. 3 and 4 depends in fact upon the dimension of the sides of the deformable quadrilateral AA'BB'. In particular, if the segment AB is shorter than the segment A'B', the straight lines bearing the segments AA' and BB' generally converge on the side AB (FIG. 1); if on the contrary, the segment A'B' is shorter than the segment AB, the convergence is generally inverted (FIG. 4). Here the adverb "generally" is used since during the deformations of the quadrilateral AA'BB' it can happen that the convergence of the opposite segments changes directions. Kinematics of these dispositions will be studied herein-below.

Figure 6:
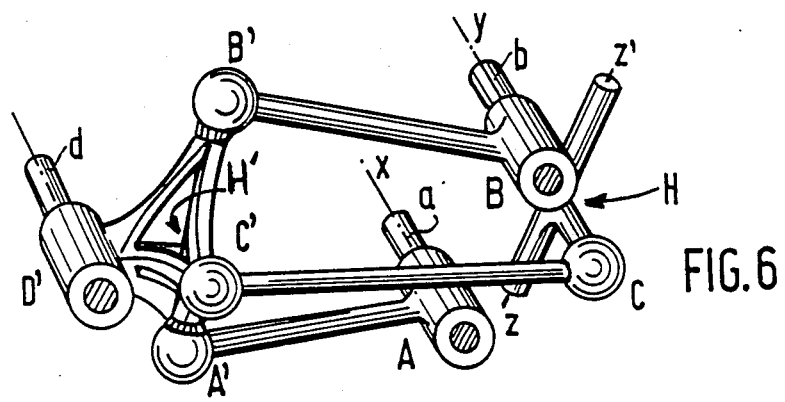
FIG. 6 represents an embodiment corresponding to FIG. 3.

With reference to FIG. 6 which schematically represents in perspective one mechanical embodiment of the principal elements of FIG. 3, the same references designate the corresponding elements.

The arms or bars AA' and BB' can pivot by any known means on axes a and b associated to the not represented vehicle body (axes Ax and By of FIG. 3). These axes are substantially perpendicular to the axial longitudinal plane of the vehicle and the bars AA' and BB' pivot parallely to this single plane.

The ends A' and B' carry through the intermediary of universal joints for example ball and socket joints, the piece having the general form of a tetrahedron A'B'C'D', the axis of the centers of the joints A'B' constituting the steering axis.

In D' is mounted the stub axle or swivle pin d of the not represented wheel (corresponding to D'D" on FIG. 1), the axle of the wheel d and the steering axis A,B' being substantially orthogonal although non converging. A third universal joint such as a ball and socket joint C' is mounted at the fourth apex of the tetrahedron, the centers A', B', C' of the ball and socket joints forming one face of the tetrahedron substantially parallel to the axis of the wheel.

The articulation C' receives one end of a link CC' of which the other end pivots preferably by a universal joint, such as a ball and socket joint, on a crank CH integral with an axis zz' driven in rotation by the handlebar or equivalent steering device.

In fact, to allow a large turning of the wheel R, it is necessary that the arms AA' and BB' move apart and assume a generally U-shaped form in order to leave the place for the rim and tread-tire assembly.

Figure 7:
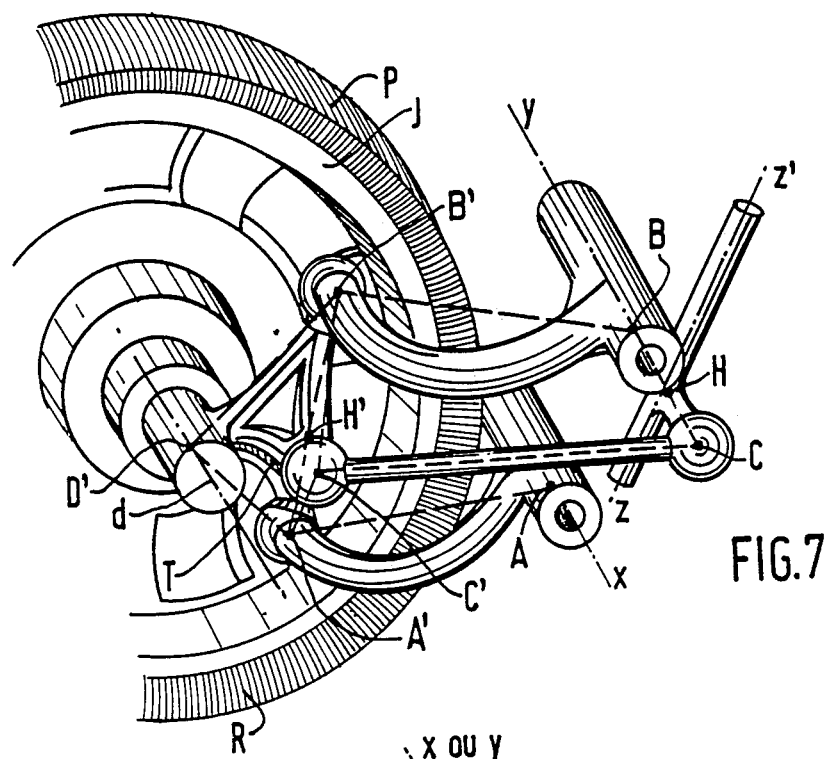
FIGS. 7 and 8 are alternatives of the device represented in FIG. 3.

FIG. 7 represents very schematically an embodiment, where the elements of the preceding figures are shown with the same references. This figure shows with their geometrical definition the centers A'B'C' of the universal joints, for example, ball and socket joints, such as represented on FIG. 6. A' and B' define the steering axis parallel to the axial longitudinal plane of the vehicle. A'B'C' define one of the sides of the tetrahedron.

The axes of rotation x and y of the arms are well defined, preferably perpendicular to the axial longitudinal plane. The points A and B are the orthogonal projections of A' and B' on the respective axes x and y. ABA'B' are thus in a single plane parallel to the axial longitudinal axis. The axle d of the wheel R is also well defined since it corresponds to the stub axle or swivel pin integral with the tetrahedric piece T. Preferably, this axis d is parallel to the side A'B'C'. The apex D' of the tetrahedron is at the intersection of the axis d and of the plane orthogonal to d, brought by the steering axis A'B'.

The arms AA', BB' present a generally U-shaped form to allow the turning of the wheel without contact with the tire P and the rim J.

Here, the portion of each arm located on the side A or B is represented as being able to be mounted on an axis of the vehicle body (not represented) maintained on the two ends. In an alternative, it is possible to envisage other solutions so that (FIG. 8) the arms in h would present one U-shaped portion such as shown in FIG. 7 and on the side of A or B two small arms $B_1$ and $B_2$ (the feet of the h) coming on either side of the vehicle, mounted on the respective axes x, y integral through their middle with the vehicle body.

The point C is the center of the joint, preferably a universal joint, for example the ball and socket joint of FIG. 7. The link CC' ensuring the steering can generally be rectilinear since it is shifted laterally and is placed aside of the wheel when said wheel turns. Furthermore, it works upon tension or compression according to the direction of the turning and the straight form is preferable especially upon compression.

The axis zz' is well defined and the point H can be the orthogonal projection of C on zz', HC forming a crank integral with the axis zz' This axis which is preferably parallel to the axial longitudinal axis and even included in this plane, is kinematically connected to the handlebar or another steering control device.

The part of the suspension and shock absorbing devices generally constituted by one or several helical springs cooperating with one or several shock absorbers has been omitted from FIGS. 6 and 7. According to one known embodiment of the prior art, coaxial spring and shock absorber are mounted between one of the arms AA'BB' and a point of the vehicle body.

It will also be noted that especially in the case where the arm lengths AA'BB' are only slightly different, for a very small stroke of the suspension, A' and B' follow circles respectively centered on A and B, and C' follows a curve only slightly different from a circle and centered adjacent to AB, even on AB (in projection on the axial longitudinal plane).

Figure 8:
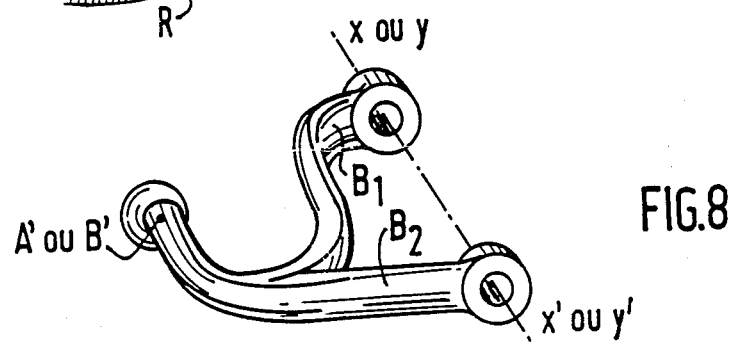

The solution represented on FIG. 8 can allow to mount C on the crank CH of an axle zz' passing substantially between the arms $B_1B_2$ of each suspension arm, which thereby allows to place C at the average center of curvature.

Figure 5A:
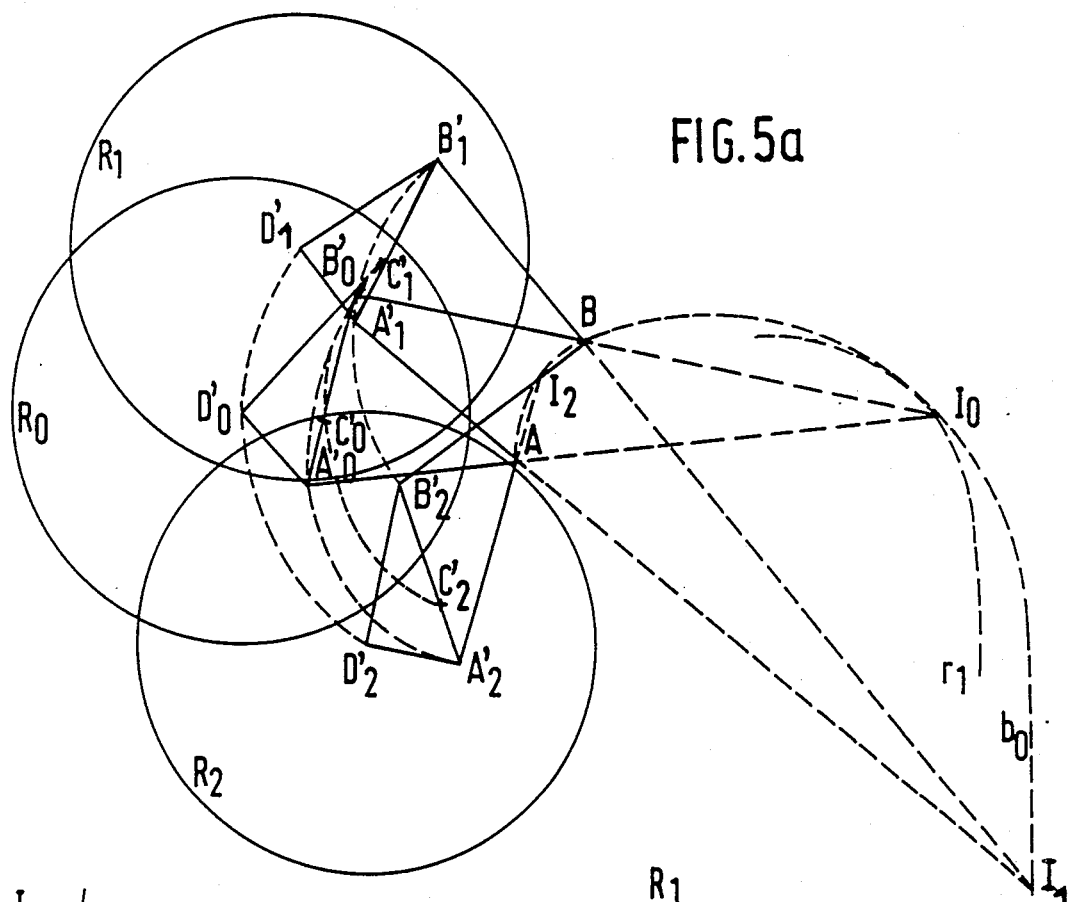
FIGS. 5a and b represent respectively the various geometric sites of suspension of FIGS. 3 and 4.

FIG. 5a represents the kinematic features of the devices represented in FIGS. 3, 6, 7 and 8. In A and B are located the pivoting axes of the arms shown in three positions: an average position $AA'_0$ and $BB'_0$, a higher position $AA'_1$ and $BB'_1$ and a low position $AA'_2$ and $BB'_2$. Under these respective references $D'_0$, $D'_1$ and $D'_2$, $C'_0$, $C'_1$ and $C'_2$ the corresponding positions of the axle (in straight line driving) and of the fourth apex C' of the tetrahedron (in projection on the figure plane). The instantenous centers of rotation corresponding respectively to the three positions are $I_0$, $I_l$ and $I_2$ that define the curve of the base $b_0$ secured in the plane of AB and associated to the body vehicle.

The rolling curve $r_1$ (site of the instantaneous center of rotation fixed in the plane $P_1$ of A'B'C' but moveable in the plane $P_0$) is represented in the position corresponding to $A'_0B'_0C'_0D'_0$. As recalled herein-above it rolls on $b_0$ in the plane $P_0$ when $P_1$ displaces with $A'_0B'_0 C'_0D'_0$ for respectively drawing a tangent in $I_l$ and in $I_2$ for the positions $A'_1B'_1C'_1D'_1$ and $A'_2B'_2C'_2D'_2$.

If the points A'B'C'D' are fixed in the plane P, they describe respectively in the plane $P_0$ the following curves:

A' an arc $A'_1A'_2$ of the circle having a center A and a radius AA'

B' an arc $B'_1B'_2$ of the circle having a center B and a radius BB'

C' an arc $C'_1C'_2$ of its roller, site of C' in $P_1$ when the roller $r_1$ rolls on the base $b_0$ D' an arc $D'_1D'_2$ of its roller, site of D' in $P_1$ when the roller $r_1$ rolls on the base $b_0$ As noted on FIG. 5a, the position $I_0A'_0B'_0C'_0D'_0$ corresponds to $I_0D'_0$ which is substantially horizontal and thus at a tangent to the roller $D'_1D'_2$ in $D'_0$ vertical since $I_0$ is the instantaneous center of rotation. It can thus be seen that by applying the rule set out hereinabove, between the position $D_0$ and the position $D_1$, the roller is orientated from the low front to the high rear which corresponds to an arrangement favorable to the dive. On the contrary, between the positions $D_0$ and $P_1$, the roller is inclined in opposite direction from the low rear to the high front, the position $D_0$ corresponding to the limit case of the vertical tangent (no dive nor anti-dive). It can thus be deduced that for an identical geometry it is possible to have different behaviours. If the device represented on FIGS. 3, 6 and 7 is considered, it is advantageous that the position shown corresponds to the full load suspension in such a manner that at average or minimal load the arms AA′ and BB′ move downwards, for example by reaching $AA'_2$ and $BB'_2$ when empty.

Figure 5B:
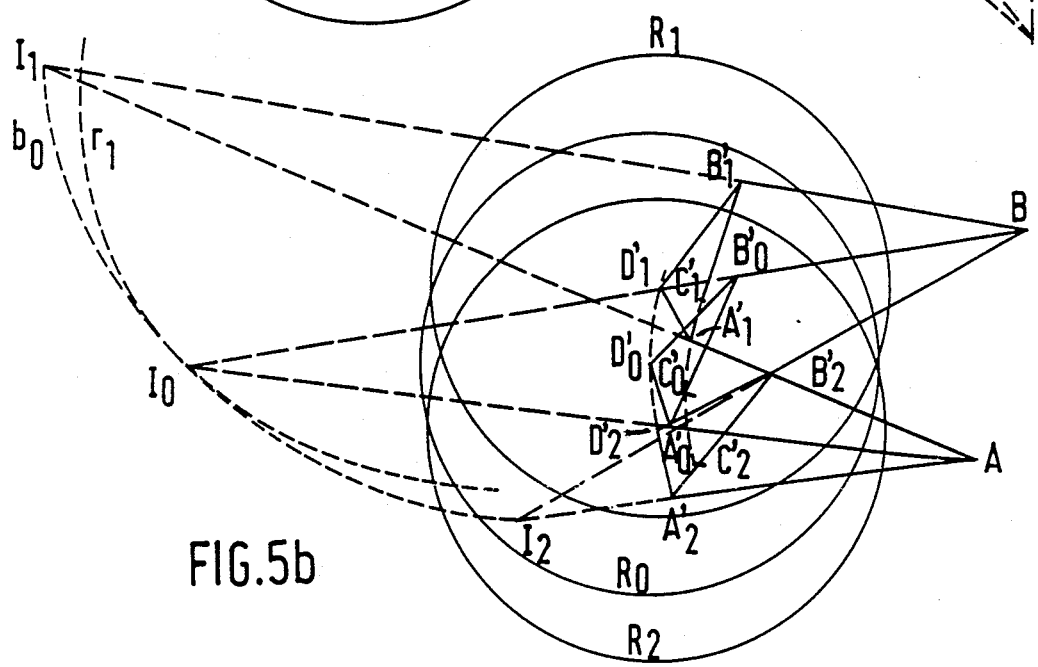

FIG. 5b which corresponds to FIG. 4 gives rise to the following comments. The roller $D'_2D'_0D'_1$ of D′ presents an arc $D'_0D'_1$ going from the front low towards the high rear, which corresponds to the dive whereas $D'_2D'_0$ goes from the low rear towards the high front which corresponds to the antidive. The position D′ at the same level as $I_0$ corresponds to the tangent that is vertical to the roller, i.e. here again at the limit case without dive nor anti-dive. The position $A'_0B'_0C'_0D'_0$ (corresponding to FIG. 4) must therefore correspond to the maximal load, an average or a minimal load corresponding to the lower positions and for example the empty vehicle at $A'_2B'_2C'_2D'_2$.

With respect to this subject, it will be noted by comparing FIGS. 5a and 5b that in the case of the first one, I is preferably in the part of the base above $I_0$ whereas in the second I is preferably below. I is thus preferably either above the level of the axle at the rear or beneath it at the front, without which the suspension encourages the dive. As mentioned herein-above, the invention applies in conditions particularly adapted to the suspension of front wheels but it is evident that a fortiori it applies to all steerable wheels or other wheels.

The invention thus applies generally to wheel suspension where the distance between the stub axle bracket and the vehicle body may be measured by the distance from the axle to a given point of the body, the axis of the cylinders for a "flat twin" engine with two opposed cylinders or the crankshaft axis for any transversal crankshaft motor, etc. This distance must therefore be increased (tangent to the roller inclined from the front high towards the low rear) or to the limit remain constant (vertical tangent when the vehicle is in non inclined position laterally on an horizontal ground) FIGS. 5a and 5b suppose that the vehicle body is fixed and the suspension is functioning (which corresponds to a ground being displaced with the wheel). It is also obvious that when the load variation bringing the suspension from one limit to another is considered, it means the vehicle at the extreme load values (static load corresponding to the light pilot, without luggage load and with the tank practically empty and reciprocally heavy driver with luggage load and full tank; charges to which should be added or deducted the dynamic loads according to their directions; braking, acceleration, unevenness and gradient of the road, etc.).

It is well understood that the examples and alternatives given in the foregoing description are adaptable to numerous variants available to those skilled in the art without in no way departing from the scope and spirit of the invention.

I claim:

1. A suspension device preventing dive of a front wheel of a vehicle, the front wheel rotatably mounted on a stub axle connected to a stub axle bracket and the vehicle having a vehicle body extending in a longitudinal plane, said suspension device comprising kinematic suspension means connected between said stub axle bracket and said vehicle body for insuring relative horizontal movement of the stub axle with respect to the vehicle body in the longitudinal plane of said vehicle when a load on said vehicle is increased, said vehicle body defining a base curve and said stub axle bracket defining a roller curve, and said kinematic suspension means providing that said base curve and said roller curve roll on each other and that tangents to said roller curve have a gradient which is lowered from a front section towards a rear section of the vehicle.

2. Suspension device according to claim 1, wherein the wheel thus suspended is a steerable wheel.

3. Device according to claim 1, wherein kinematic suspension means includes two arms, each pivotally connected at one end to the stub axle bracket and at an opposite end pivotally connected on two axes of the vehicle body.

4. Device according to claim 3, wherein the two axes are substantially orthogonal to the longitudinal plane of the vehicle.

5. Device according to claim 1, wherein said stub axle moves away from the vehicle body when the load is increased.

6. Device according to claim 1 wherein at maximal load, the tangent to said roller curve is vertical when the vehicle is in a vertical position in said longitudinal plane.

* * * * *